United States Patent
Omaki et al.

(10) Patent No.: US 8,089,546 B2
(45) Date of Patent: Jan. 3, 2012

(54) CAMERA WITH INTERCHANGEABLE LENS UNIT

(75) Inventors: Minoru Omaki, Kunitachi (JP); Yu Kondo, Yamato (JP); Toyokazu Mizoguchi, Kamiinagun (JP); Hideki Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 375 days.

(21) Appl. No.: 11/903,228

(22) Filed: Sep. 20, 2007

(65) Prior Publication Data

US 2008/0088728 A1    Apr. 17, 2008

(30) Foreign Application Priority Data

Sep. 29, 2006 (JP) ................................. 2006-267377

(51) Int. Cl.
*H04N 5/222* (2006.01)

(52) U.S. Cl. .................................. 348/333.01; 348/345
(58) Field of Classification Search ............. 348/333.01, 348/345
See application file for complete search history.

(56) References Cited

U.S. PATENT DOCUMENTS

| 2003/0048374 A1 | 3/2003 | Omaki et al. |
| 2003/0058356 A1 * | 3/2003 | DiCarlo et al. ............... 348/241 |
| 2005/0212955 A1 * | 9/2005 | Craig et al. ................... 348/362 |

FOREIGN PATENT DOCUMENTS

| JP | 11-112859 | | 4/1999 |
| JP | 11112859 A | * | 4/1999 |
| JP | 2003-78794 | | 3/2003 |

* cited by examiner

*Primary Examiner* — Jason Chan
*Assistant Examiner* — Usman Khan
(74) *Attorney, Agent, or Firm* — Kenyon & Kenyon LLP

(57) ABSTRACT

In a camera in which a lens unit can be replaced, a camera, which individually grasps lens characteristics corresponding to a picked-up subject image, is provided. The camera is characterized by including a camera main body, a lens unit having an image pickup optical system for focusing a subject image, an image pickup means for picking up the subject image and converting it into electric image information, an optical characteristics memory unit for storing optical characteristics inherent to the image pickup optical system, an image memory unit for storing the image information and the optical characteristics of the lens unit used when the image information is obtained by causing them to correspond to each other, and an image processing means for subjecting the image information to image processing based on the optical characteristics which are caused to correspond to the image information.

4 Claims, 12 Drawing Sheets

CAMERA WITH INTERCHANGEABLE LENS UNIT

BACKGROUND OF THE INVENTION

1. Field of the Invention

The present invention relates to a camera. This application is based on Japanese Patent Application No. 2006-267377, the content of which is incorporated herein by reference.

Note that, this application is based on Japanese Patent Application No. 2006-267377, and the contents thereof are incorporated therein.

2. Description of Related Art

Recently, since a so-called digital electronic camera, in which an image pickup device such as CCD (Charge Coupled Devices) and the like is disposed, has become widespread, a camera having an image processing CPU (Central Processing Unit) disposed in a camera main body is ordinarily used widely. The image processing CPU carries out correction processing and the like to digitized image data of electric image information obtained by the image pickup device.

The image data correction processing in the image processing CPU is sometimes carried out based on the optical characteristics of a lens unit mounted on the camera. Accordingly, in a lens replacement type camera having a replacement lens detachably mounted on a camera main body, correction processing in an image processing CPU must be changed according to the optical characteristics of respective lens units each time a lens unit is replaced to accurately carry out desired correction processing.

Thus, there is disclosed a camera for switching lens characteristics used to correction processing by providing respective lens units with a lens characteristics code inherent to them (refer to, for example, Japanese Unexamined Patent Application Publication No. 11-112859).

Specifically, when a lens unit is mounted on a camera main body, an image processing CPU reads the lens characteristics code of the lens unit to thereby switch lens characteristics used to the correction processing.

BRIEF SUMMARY OF THE INVENTION

A first aspect is a camera including:
a camera main body;
a lens unit having an image pickup optical system for focusing a subject image;
an image pickup means for picking up the subject image and converting it into electric image information;
an optical characteristics memory unit for storing optical characteristics inherent to the image pickup optical system;
an image memory unit for storing the image information and the optical characteristics of the lens unit used when the image information is obtained by causing them to correspond to each other; and
an image processing means for subjecting the image information to image processing based on the optical characteristics which are caused to correspond to the image information.

A second aspect is the camera of the first aspect including:
a display unit; and
a display image signal processing means for creating respective image display data by subjecting image data after image processing subjected to image processing by the image processing means and image data before the image processing before it is subjected to the image processing by the image processing means, respectively as well as causing the display unit to display the image data after the image processing and the image data before the image processing for comparison.

A third aspect is the camera of the first aspect, wherein the image memory unit stores the image information and the identification information of the lens unit by causing them to correspond to each other.

A fourth aspect is the camera of the first aspect, wherein:
the optical characteristics memory unit is disposed to the lens unit and detachably mounted on the camera main body together with the lens unit; and
an optical characteristics read unit for reading the optical characteristics from the optical characteristics memory unit is disposed to the camera main body.

DETAILED DESCRIPTION OF THE INVENTION

Figure 1:
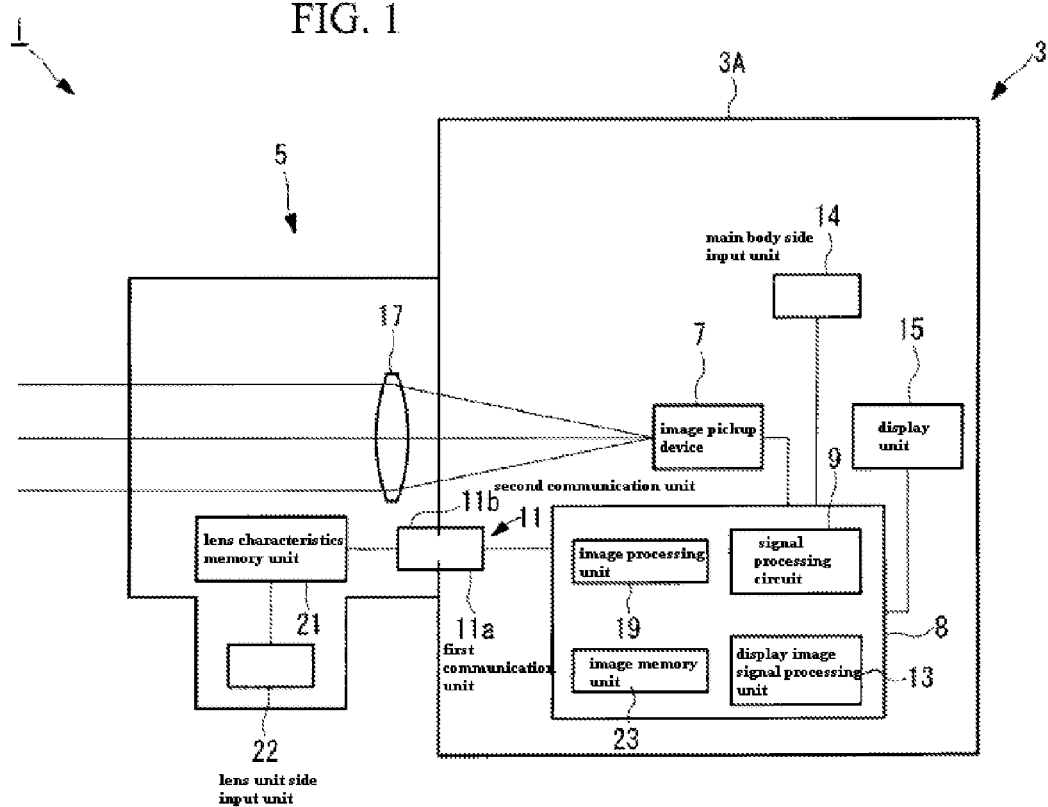
FIG. 1 is a block diagram explaining the overall arrangement of a camera according to a first embodiment.

A camera of the present invention includes a camera main body, a lens unit having an image pickup optical system for focusing a subject image, an image pickup means for picking up the subject image and converting it into electric image information, an optical characteristics memory unit for storing optical characteristics inherent to the image pickup optical system, an image memory unit for storing image information and the optical characteristics of the image pickup optical system used when the image information is obtained by causing them to correspond to each other, and an image processing means for subjecting the image information to image processing based on the optical characteristics which are caused to correspond to the image information.

According to the camera, since the image information before the image processing and the optical characteristics are stored to the image memory unit by being caused to correspond to each other, when, for example, a subject image is picked up using a plurality of lens units each having image pickup optical system having different optical characteristics, the optical characteristics of the respective image pickup optical systems used to pick up the respective image information are stored in correspondence to the respective picked-up image information. Accordingly, even after a lens unit is replaced, the optical characteristics of the image pickup optical systems used to obtain the respective image information can be individually grasped.

On the other hand, the image information stored to the image memory unit is subjected to image processing in image processing means based on the optical characteristics which are caused to correspond thereto. Accordingly, even if a lens unit is replaced, appropriate image processing is carried out to the image information before the image processing based on the optical characteristics of the image pickup optical system used to pick up the image information.

It is preferable that the camera be provided with a display unit and a display image signal processing means for creating respective image display information by subjecting image information after it is subjected to image processing by an image processing means and image information before it is subjected to the image processing by the image processing means to signal processing, respectively as well as for displaying the image information after the image processing and the image information before the image processing on the display unit for comparison.

According to the camera as described above, the image information before the image processing and after the image processing are subjected to the signal processing in the display image signal processing means, respectively and converted into the image display information. Then, the image display information according to the image information before and after the image processing are displayed on display unit in a state that they can be compared with each other.

It is preferable in the camera that the image memory unit store the image information and the identification information of the lens unit by causing them to correspond to each other.

According to the camera, since the image information is caused to correspond to the identification information of the lens unit, even if a lens unit is replaced, the lens unit used to obtain the image information is grasped. When the lens unit is grasped, the optical characteristics of the image pickup optical system mounted on the lens unit is grasped, thereby the optical characteristics of the image pickup optical system used to pick up a subject is grasped.

In the camera, it is preferable that the optical characteristics memory unit be mounted on the lens unit and detachably mounted on the camera main body together with the lens unit and that an optical characteristics read unit for reading the optical characteristics from the optical characteristics memory unit be mounted on the camera main body.

According to the camera arranged as described above, since the optical characteristics memory unit is detachably mounted on the camera main body together with the lens unit, when the lens unit is replaced, the optical characteristics memory unit is also replaced. The optical characteristics read unit reads optical characteristics from the replaced optical characteristics memory unit and outputs it to the image memory unit. Accordingly, even if a lens unit is replaced, the image memory unit stores the image information before the image processing and the optical characteristics according to the replaced lens unit in the state that they are caused to correspond to each other.

According to the camera, there can be achieved an advantage that since the image information before the image processing and the optical characteristics are stored to the image memory unit by being caused to correspond to each other, the lens characteristics corresponding to the picked up subject image can be individually grasped even after the lens unit is replaced.

First Embodiment

A camera according to a first embodiment will be explained below referring to FIGS. 1 and 2.

FIG. 1 is a block diagram explaining the overall arrangement of the camera.

The camera 1 is a digital electronic camera for picking up a subject image using an image pickup device such as a CCD and the like.

As shown in FIG. 1, the camera 1 includes a camera main body 3 and a lens unit 5.

The lens unit 5 is detachably mounted on a housing 3A of the camera main body 3 to be described later through a known mounting/dismounting mechanism. Various types of the lens units 5 having a different focal length and the like can be mounted on the housing 3A.

The camera main body 3 has an image pickup device 7 and the like for picking up a subject image disposed therein, and the lens unit 5 is detachably mounted on the camera main body 3. As shown in FIG. 1, the camera main body 3 has the housing 3A, the image pickup device (image pickup means) 7, a main body side controller 8, a first communication unit (optical characteristics read unit) 11a, and a display unit 15.

The housing 3A constitutes the exterior of the camera main body 3, and the image pickup device 7, the main body side controller 8, the first communication unit 11a, the display unit 15, and the like are accommodated in the housing 3A.

The image pickup device 7 creates an image pickup signal (electric image information) based on the subject image focused on the image pickup device 7. The image pickup device 7 is disposed at the position where the subject image converged by the lens unit is focused on the image pickup device 7. The image pickup signal output from the image pickup device 7 is input to a signal processing circuit 9 of the main body side controller 8. Note that although known image pickup devices such as a CCD a CMOS (Complementary Metal Oxide Semiconductor), and the like can be used as the image pickup device 7, it is not particularly limited thereto.

The main body side controller 8 includes the signal processing circuit 9, an image processing unit (image processing means) 19, an image memory unit 23, and the display image signal processing unit 13. Further, a main body side input unit 14 is disposed to the main body side controller 8.

The signal processing circuit 9 creates image data by subjecting the image pickup signal output from the image pickup device 7 to signal processing such as analog to digital conversion processing and the like. The image pickup signal is input to the signal processing circuit 9 from the image pickup device 7. The image data subjected to the signal processing in the signal processing circuit 9 is output to the image processing unit 19 and to the display image signal processing unit 13.

The image processing unit 19 subjects image data to image processing based on the characteristics of a lens system 17. The image data is input to the image processing unit 19 from the signal processing circuit 9 as well as lens characteristics are input thereto from a second communication unit 11b. The image data after the image processing is output from the image processing unit 19 to the display image signal processing unit 13 as well as the image data before the image processing and the lens characteristics which are caused to correspond to them are output to the image memory unit 23. Note that a known arithmetic operation device such as a CPU, a DSP (Digital Signal Processor), and the like can be used as the image processing unit 19 without a particular limitation.

The image memory unit 23 stores the image data before the image processing and the lens characteristics by causing them to correspond to each other. The image data before the image processing and the lens characteristics which are caused to correspond to them are input and output between the image memory unit 23 and the image processing unit 19. Further, the image memory unit 23 may be arranged such that it can output only the image data before the image processing.

The display image signal processing unit 13 creates image display data by subjecting the image data before the image processing and the image data after the image processing to signal processing. The image data before the image processing is input to the display image signal processing unit 13 from the signal processing circuit 9 as well as the image data after the image processing is input thereto from the image processing unit 19. The mage display data is output from the display image signal processing unit 13 to the display unit 15.

The main body side input unit 14 inputs a parameter value, for example, a correction parameter value, which defines an image processing algorithm used by a photographer in the image processing unit 19, and the input parameter value is output to the main body side controller 8.

Note that the parameter value which defines the image processing algorithm may be input to the main body side input unit 14 or to a lens unit side input unit 22 to be described later without a particular limitation.

The first communication unit 11a constitutes a communication unit 11 together with the second communication unit 11b and reads the lens characteristics. The lens characteristics are input to the first communication unit 11a from the second communication unit 11b. The lens characteristics are output from the first communication unit 11a to the image processing unit 19.

The display unit 15 is composed of an LCD (Liquid Crystal Display) and the like and displays the subject image based on the image display data. The image display data is input to the display unit 15 from the display image signal processing unit 13 of the main body side controller 8.

The lens unit 5 focuses the subject image on the image pickup device 7 by the lens system (image pickup optical system) 17 disposed therein and is detachably mounted on the camera main body 3. As shown in FIG. 1, the lens unit 5 includes the lens system 17, the second communication unit 11b, a lens characteristics memory unit (optical characteristics memory unit) 21, and the lens unit side input unit 22.

The lens system 17 focuses the light from subject on the light receiving surface of the image pickup device 7.

The second communication unit 11b constitutes the communication unit 11 together with the first communication unit 11a disposed to the camera main body and reads the lens characteristics. The lens characteristics are input to the second communication unit 11b from the lens characteristics memory unit 21. The lens characteristics are output from the second communication unit 11b to the first communication unit 11a.

The lens characteristics memory unit 21 stores the lens characteristics of the lens system 17. The lens characteristics are output from the lens characteristics memory unit 21 to the second communication unit 11b. Note that optical characteristics such as the distortion and the like of the lens system 17 can be exemplified as the lens characteristics.

Further, the lens characteristics memory unit 21 may store the identification information of the lens unit 5. The focal length, the F number, the zoom magnification of the lens system 17 and the information of the manufacturer of the lens unit 5 can be exemplified as the identification information of the lens unit 5.

The identification information may be displayed on the display unit 15 simultaneously with the image data before the image processing or may be displayed on the display unit 15 simultaneously with the image data after the image processing. Otherwise, the identification information may be displayed at the same time when the image data before the image processing and the image data after the image processing are displayed on the display unit 15 for comparison without a particular limitation.

The lens unit side input unit 22 is input with the parameter value, for example, the correction parameter value for defining the image processing algorithm used by the photographer in the image processing unit 19, and the input parameter value is output to and stored in the lens characteristics memory unit 21.

Note that the parameter value that defines the image processing algorithm may be input to the lens unit side input unit 22 or may be input to the main body side input unit 14 described above without a particular limitation.

Next, the operation and the picked-up image processing method in the camera 1 having the above arrangement will be explained.

Figure 2:
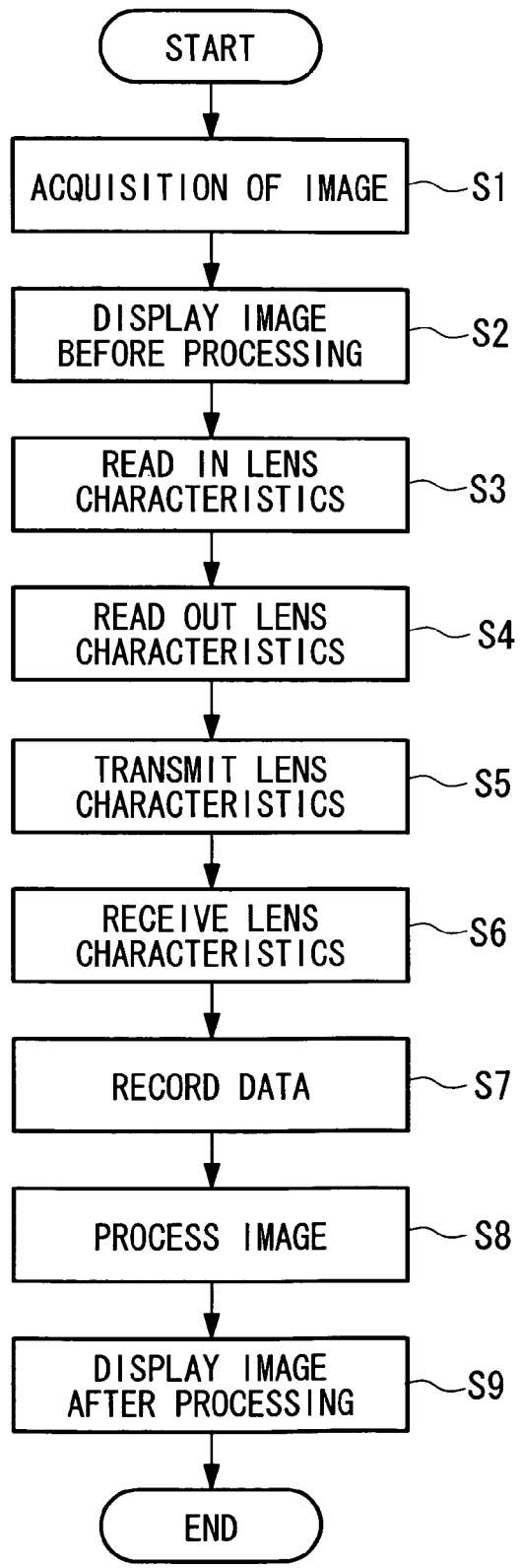
FIG. 2 is a flowchart explaining the operation of the camera of FIG. 1.

FIG. 2 is a flowchart explaining the operation of the camera of FIG. 1.

When a subject is picked up, the image of the subject focused by the lens system 17 of the lens unit 5 is converted into image pickup data as an electric signal by the image pick-up device 7 (step S1).

The image pickup data is input from the image pickup device 7 to the signal processing circuit 9 of the main body side controller 8. The signal processing circuit 9 subjects the image pickup data to signal processing and converts it into image data which can be processed in the display image signal processing unit 13 and the image processing unit 19. The image data is input from the signal processing circuit 9 to the display image signal processing unit 13 as the image data before the image processing. The display image signal processing unit 13 converts the image data before the image processing into image display data which can be displayed on the display unit 15. The image display data is input to the display unit 15 as well as stored to a cache memory. The display unit 15 displays the same image as the subject image subjected to the image processing and stored to the cache memory (step S2).

The image data before the image processing is also input to the image processing unit 19. The image processing unit 19 outputs a read signal for instructing the first communication unit 11a to read the lens characteristics from the lens characteristics memory unit 21 (step S3).

The first communication unit 11a transmits the read signal to the second communication unit 11b.

The second communication unit 11b outputs the read signal to the lens characteristics memory unit 21 and reads out the lens characteristics from the lens characteristics memory unit 21 (step S4). The second communication unit 11b transmits the read lens characteristics to the first communication unit 11a (step S5).

The first communication unit 11a receives the transmitted lens characteristics (step S6), and the lens characteristics are input to the image processing unit 19 of the main body side controller 8. The image processing unit 19 outputs the image data before the image processing and the lens characteristics to the image memory unit 23 by causing them to correspond to each other. The image memory unit 23 stores the image data before the image processing and the lens characteristics by causing them to correspond to each other (step S7).

When the image after the image processing is displayed, the image processing unit 19 subjects the image data before the image processing to image processing based on the lens characteristics and creates the image data after the image processing (step S8). The image data before the image processing and the lens characteristics may be read out from the image memory unit 23 or the data before the image processing and the lens characteristics stored to the cache memory disposed to the image processing unit 19 may be used without a particular limitation.

The image data after the image processing is input from the image processing unit 19 to the display image signal processing unit 13. The display image signal processing unit 13 converts the image data after the image processing into the image display data which can be displayed on the display unit 15. The image display data is input to the display unit 15 as well as stored to the cache memory. The display unit 15 displays the same image as the image of the subject subjected to the image processing and stored to the cache memory (step S9).

Note that the cache memory also stores image display data as to the images other than the image displayed on display unit 15 at the time. When, for example, picked-up images are displayed on the display unit 15 in a picked-up sequence, image display data and the like as to an image to be displayed next to the image displayed at the time is also previously stored to the cache memory.

Note that the correction parameter value which defines the processing method in the image processing unit 19 may be changed from the main body side input unit 14 or the lens unit side input unit 22. That is, a degree of correction of aberrations may be changed by changing the correction parameter value.

According to the above arrangement, since the image data before the image processing and the lens characteristics are stored to the image memory unit 23 by being caused to correspond to each other, when, for example, a subject is picked up using a plurality of the lens units 5 each having a lens system 17 with different lens characteristics, the lens characteristics of the lens systems 17 used when respective image data are picked up are stored to the image memory unit 23 by being caused to correspond to the respective picked-up image data. Accordingly, even after the lens unit is replaced, the lens characteristics of the lens systems 17 used to obtain the respective image data can be individually grasped.

On the other hand, the image data stored to the image memory unit 23 is subjected to image processing in the image processing unit 19 based on the lens characteristics stored by being correspond to the image data. Accordingly, even if the lens unit 5 used to image pick-up is replaced, appropriate image processing is applied to the image data before the image processing based on the lens characteristics of the lens system 17 used to pick up the image data.

When the image data before the image processing and the lens characteristics corresponding thereto, which are stored to the image memory unit 23, are subjected to image processing using the image processing software and the like installed on, for example, a personal computer, image processing other than the image processing carried out in the image processing 19 of the camera 1 can be applied to the image data before the image processing.

Ordinarily, since the lens characteristics of the lens system 17 are not stored to the image processing software and the like installed on the personal computer, even if only the image data before the image processing is input to the image processing software and the like, it is difficult to sufficiently subject the aberrations and the like due to the lens characteristics to image processing.

However, in the camera 1 of the embodiment, since the lens characteristics corresponding to the image data before the image processing can be individually grasped, the image data before the image processing and the lens characteristics corresponding thereto can be input to the image processing software and the like, thereby the aberrations and the like due to the lens characteristics can be sufficiently subjected to the image processing.

The image data before and after the image processing are subjected to signal processing in the display image signal processing unit 13, respectively and converted into image display data. Then, the image display data according to the image information before and after the image processing are displayed on the display unit 15 in the state that both the image display data can be compared. The photographer can determine whether or not he or she could apply intended image processing to the image data by comparing the displayed images before and after the image processing.

Since the image data before the image processing and the identification information of the lens unit 5 are stored by being caused to correspond to each other, even if a lens unit is replaced, the lens unit 5 used when the image data was obtained can be grasped. When the lens unit 5 is grasped, the lens characteristics of the lens system 17 mounted on the lens unit 5 is grasped, thereby the lens characteristics of the lens system 17 used to pick up the subject can be grasped.

Since the lens characteristics memory unit 21 is detachably mounted on the camera main body 3 together with the lens unit 5, when the lens unit 5 is replaced, the lens characteristics memory unit 21 is also replaced. The first communication unit 11a reads the lens characteristics from the lens characteristics memory unit 21 after replacement and outputs them to the image memory unit 23. Accordingly, even if the lens unit 5 is replaced, the image memory unit 23 stores the image data before the image processing and the lens characteristics according to the lens unit 5 after replacement.

Modification of First Embodiment

Next, a modification of the first embodiment will be explained referring to FIGS. 3 and 4.

Although the basic arrangement of a camera is the same as the first embodiment, a picked-up image processing method is different from the first embodiment. Thus, in the modification, only the arrangement and the processing method as to the modification of the picked-up image processing method will be explained using FIGS. 3 and 4, and the explanation of the other components and the like are omitted.

Figure 3:
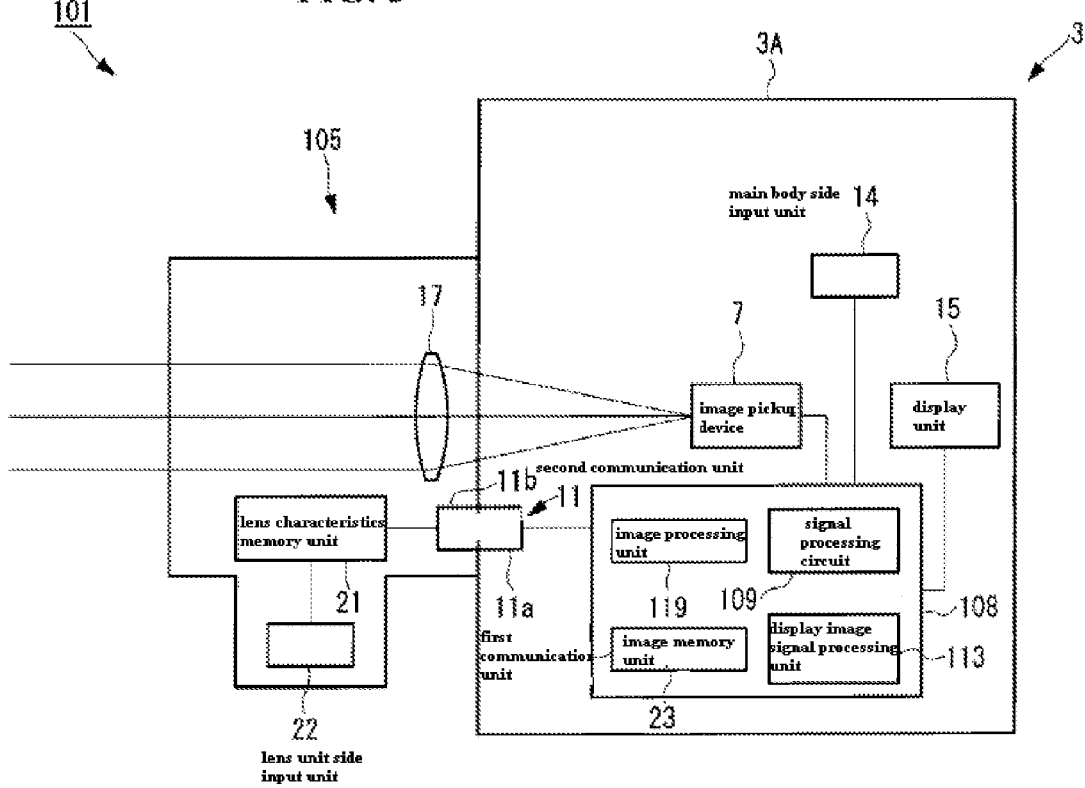
FIG. 3 is a block diagram explaining the overall arrangement of a camera according to a modification of the first embodiment.

FIG. 3 is a block diagram explaining the overall arrangement of the camera.

Note that the same components as those of the first embodiment are demoted by the same reference numerals and the explanation thereof is omitted.

The camera 101 is a digital electronic camera for picking up a subject image using an image pickup device such as a CCD and the likewise the first embodiment.

As shown in FIG. 3, the camera 101 has a camera main body 103 and a lens unit 5.

The lens unit 5 is detachably mounted on a housing 3A to be described later. Different types of lens units 5 can be mounted on the housing 3A.

The camera main body 103 has an image pickup device 7 and the like for picking up a subject image disposed therein, and the lens unit 5 is detachably mounted on the camera main body 103. As shown in FIG. 3, the camera main body 3 has the housing 3A, the image pickup device 7, a main body side controller 108, a first communication unit 11a, and a display unit 15.

The main body side controller 108 includes a signal processing circuit 109, an image processing unit (image processing means) 119, an image memory unit 23, and a display image signal processing unit 113. Further, a main body side input unit 14 is disposed to the main body side controller 108.

The signal processing circuit 109 creates image data by subjecting the image pickup data output from the image pickup device 7 to signal processing. The image pickup data is input to the signal processing circuit 109 from the image pickup device 7. The image data subjected to the signal processing in the signal processing circuit 109 is output to the image processing unit 119.

The image processing unit 119 applies image processing to the image data based on the lens characteristics of a lens system 17. The image data is input to the image processing unit 119 from the signal processing circuit 109 as well as the lens characteristics are input thereto from a second communication unit 11b. The image data before the image processing and the image data after the image processing are output from image processing unit 119 to the display image signal processing unit 113 as well as the image data before the image processing and the lens characteristics which are caused to correspond thereto are output to the image memory unit 23.

The display image signal processing unit 113 creates image display data by subjecting the image data before the image processing and the image data after the image processing to signal processing. The image data before the image processing and the image data after the image processing are input to the display image signal processing unit 113 from the image processing unit 19. The image display data is output to the display unit 15 from the display image signal processing unit 113, Next, the operation and the picked-up image processing method of the camera 101 having the above arrangement will be explained.

Figure 4:
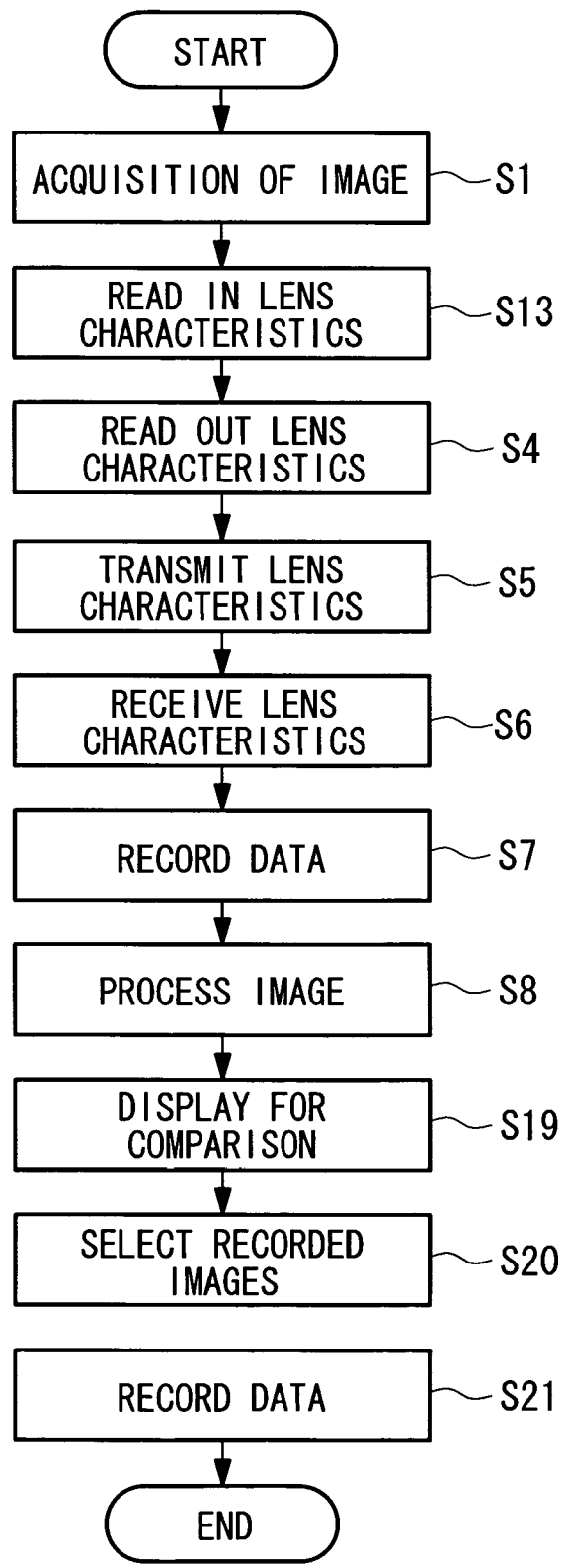
FIG. 4 is a flowchart explaining the operation of the camera of FIG. 3.

FIG. 4 is a flowchart explaining the operation of the camera of FIG. 3.

When a subject is picked up, the image of the subject focused by the lens system 17 of the lens unit 105 is converted into image pickup data as an electric signal by the image pickup device 7 (step S1).

The image pickup data is input to the signal processing circuit 109 of the main body side controller 108 from the image pickup device 7. The signal processing circuit 109 subjects the image pickup data to signal processing and converts it into image data which can be processed in the display image signal processing unit 113 and the image processing unit 119. The image data is input from the signal processing circuit 109 to the image processing unit 119. The image processing unit 119 outputs a read signal for instructing the first communication unit 11a to read the lens characteristics from a lens characteristics memory unit 21 (step S13).

The first communication unit 11a transmits the read signal to the second communication unit 11b. The second communication unit 11b outputs the read signal to the lens characteristics memory unit 21 and reads out the lens characteristics from the lens characteristics memory unit 21 (step S4).

The second communication unit 11b transmits the read-out lens characteristics to the first communication unit 11a (step S5).

The first communication unit 11a receives the lens characteristics transmitted thereto (step S6), and the lens characteristics are input to the image processing unit 119 of the main body side controller 108. The image processing unit 119 outputs the image data before the image processing and the lens characteristics to the image memory unit 23 by causing them to correspond to each other. The image memory unit 23 stores the image data before the image processing and the lens characteristics by causing them to correspond to each other (step S7).

The image processing unit 119 subjects the image data before the image processing to image processing based on the lens characteristics and creates the image data after the image processing (step S8). The image data before the image processing and the lens characteristics may be read out from the image memory unit 23 or the data before the image processing and the lens characteristics stored to the cache memory described above may be used without a particular limitation.

The image processing unit 119 outputs the image data before the image processing and the image data after the image processing to the display image signal processing unit 113. The display image signal processing unit 113 converts the image data before and after the image processing into the image display data which can be displayed on the display unit 15. The image display data before and after the image processing are input to the display unit 15 as well as stored to the cache memory. The display unit 15 displays the same images as the images before and after the image processing stored to the cache memory for comparison (step S19).

The image data before and after the image processing may be simultaneously displayed by dividing the display surface of the display unit 15 or may be alternately displayed with a time lag without a particular limitation.

The photographer selects which of the image data before and after the image processing displayed on the display unit 15 is to be stored (step S20). Selected image data is stored to the image memory unit 23 (step S21). Specifically, when the image data before the image processing is selected, it is stored to the image memory unit 23 as it is. On the other hand, when the image data after the image processing is selected, it is stored to the image memory unit 23 after it is further caused to correspond to the lens characteristics.

According to the above arrangement, the photographer can determines whether or not he or she could apply intended image processing to the image data by comparing the displayed images before and after the image processing as well as can select whether or not the image data after the image processing is to be stored.

Second Embodiment

Next, a second embodiment will be explained referring to FIGS. 5 and 6.

Although the basic arrangement of a camera is the same as the first embodiment, an image processing unit is disposed differently from the first embodiment. Accordingly, in the embodiment, only the periphery of the image processing unit will be explained using FIGS. 5 and 6, and the explanation of the other components and the like is omitted.

Figure 5:
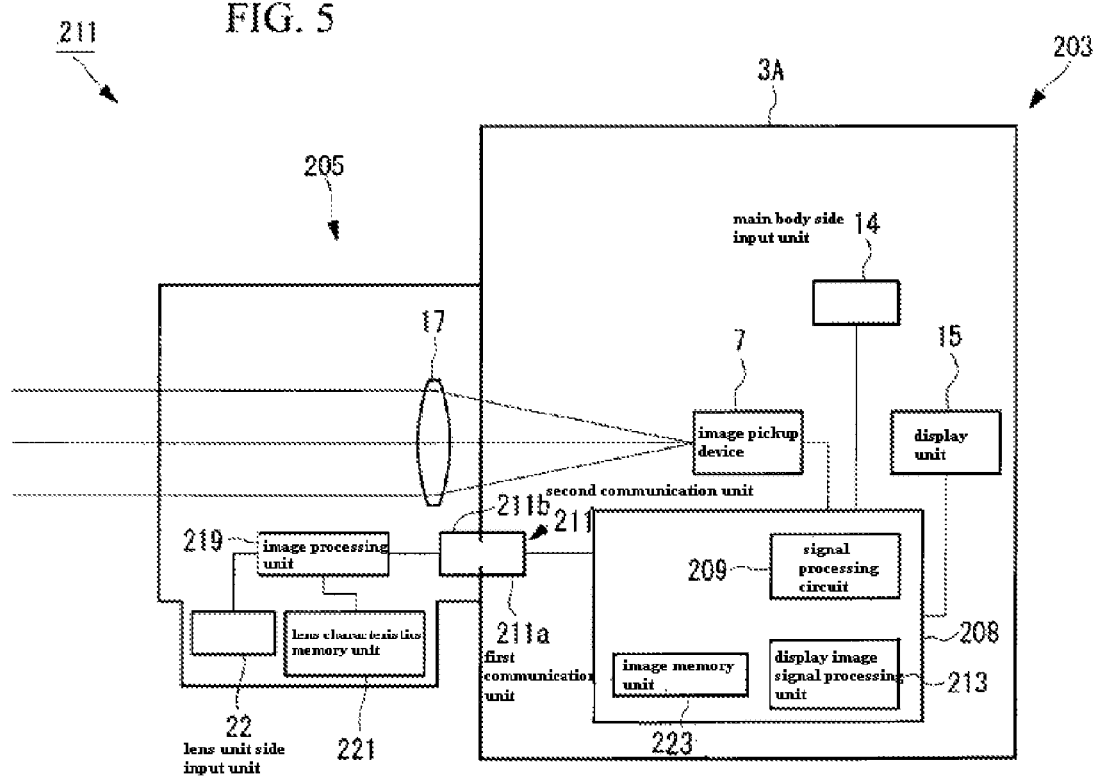
FIG. 5 is a block diagram explaining the overall arrangement of a camera according to a second embodiment.

FIG. 5 is a block diagram explaining the overall arrangement of the camera.

Note that the same components as those of the first embodiment are denoted by the same reference numerals and the explanation thereof is omitted.

The camera 201 is a digital electronic camera for picking up a subject image using an image pickup device such as a CCD and the like.

As shown in FIG. 5, the camera 201 has a camera main body 203 and a lens unit 205.

The lens unit 205 is detachably mounted on a housing 3A. Different types of lens units 205 can be mounted on the housing 3A.

The camera main body 203 has an image pickup device 7 and the like for picking up a subject image disposed therein, and the lens unit 205 is detachably mounted on the camera main body 203. As shown in FIG. 5, the camera main body 203 has the housing 3A, the image pickup device 7, a main body side controller 208, a first communication unit 211a, and a display unit 15.

The main body side controller 208 includes a signal processing circuit 209, an image memory unit 223, and a display image signal processing unit 213. Further, a main body side input unit 14 is disposed to the main body side controller 208.

The signal processing circuit 209 creates image data by subjecting the image pickup data output from the image pickup device 7 to signal processing. The image pickup data is input to the signal processing circuit 209 from the image pickup device 7. The image data subjected to the signal processing in the signal processing circuit 209 is output to the first communication unit 211a and a display image signal processing unit 213.

The image memory unit 223 stores image data before image processing and the lens characteristics by causing them to correspond to each other. The image data before the image processing and the lens characteristics, which are caused to correspond to each other, are input and output between the image memory unit 223 and an image processing unit 19 through an communication unit 211.

The display image signal processing unit 213 creates image display data by subjecting the image data before the image processing and the image data after the image processing to signal processing. The image data before the image processing is input to the display image signal processing unit 213 from the signal processing circuit 209 as well as the image data after the image processing is input thereto from the first communication unit 211a. The image display data is output from the display image signal processing unit 213 to the display unit 15.

The first communication unit 11a 211a constitutes the communication unit 211 together with the second communication unit 11a 211b disposed to the lens unit 205 and exchanges the image data and the like. The image data before the image processing and the image data after the image processing are input to the first communication unit 211a from the second communication unit 211b. The image data before the image processing and the image data after the image processing are output from the first communication unit 211a to the display image signal processing unit 213 of the main body side controller 208 as well as the image data before the image processing and the lens characteristics, which are caused to correspond thereto, are output to the image memory unit 223 of the main body side controller 208.

The lens unit 205 focuses a subject image to the image pickup device 7 by the lens system 17 disposed therein and is detachably mounted on the camera main body 203. As shown in FIG. 5, the lens unit 205 includes a lens system 17, the second communication unit 211b, an image processing unit (image processing means) 219, and a lens characteristics memory unit (optical characteristics memory unit) 221.

The second communication unit 211b constitutes the communication unit 211 together with the first communication unit 211a disposed to the camera main body 203 and exchanges the image data before the image processing and the image data after the image processing. The image data before the image processing is input to the second communication unit 211b from the first communication unit 211a as well as the image data after the image processing, the image data before the image processing, and the lens characteristics, which are caused to correspond thereto, are input thereto from the image processing unit 219. The image data before the image processing is output from second communication unit 211b to the image processing unit 219 as well as the image data after the image processing, the image data before the image processing, and the lens characteristics, which are caused to correspond thereto, are output to the first communication unit 11a 211a.

The image processing unit 219 applies image processing to the image data based on the characteristics of the lens system 17. The image data before the image processing is input to the image processing unit 219 from the second communication unit 211b as well as the lens characteristics are input thereto from the lens characteristics memory unit 221. The image data after the image processing is output from the image processing unit 219 to the second communication unit 211b as well as the image data before the image processing and the lens characteristics, which are caused to correspond thereto, are output thereto. Further, the image processing unit 219 has an algorithm for carrying out image processing in conformity with the characteristics of the lens system 17 of the lens unit 205.

The lens characteristics of the lens system 17 are stored to the lens characteristics memory unit 221. The lens characteristics are output from the lens characteristics memory unit 221 to the image processing unit 219. Note that optical characteristics such as the distortion and the like of the lens system 17 can be exemplified as the lens characteristics.

Further, the identification information of the lens unit 5 may be stored to the lens characteristics memory unit 221 likewise first embodiment.

The identification information may be displayed on the display unit 15 simultaneously with the image data before the image processing likewise the first embodiment without a particular limitation.

Next, the operation and the picked-up image processing method in the camera 201 having the above arrangement will be explained.

Figure 6:
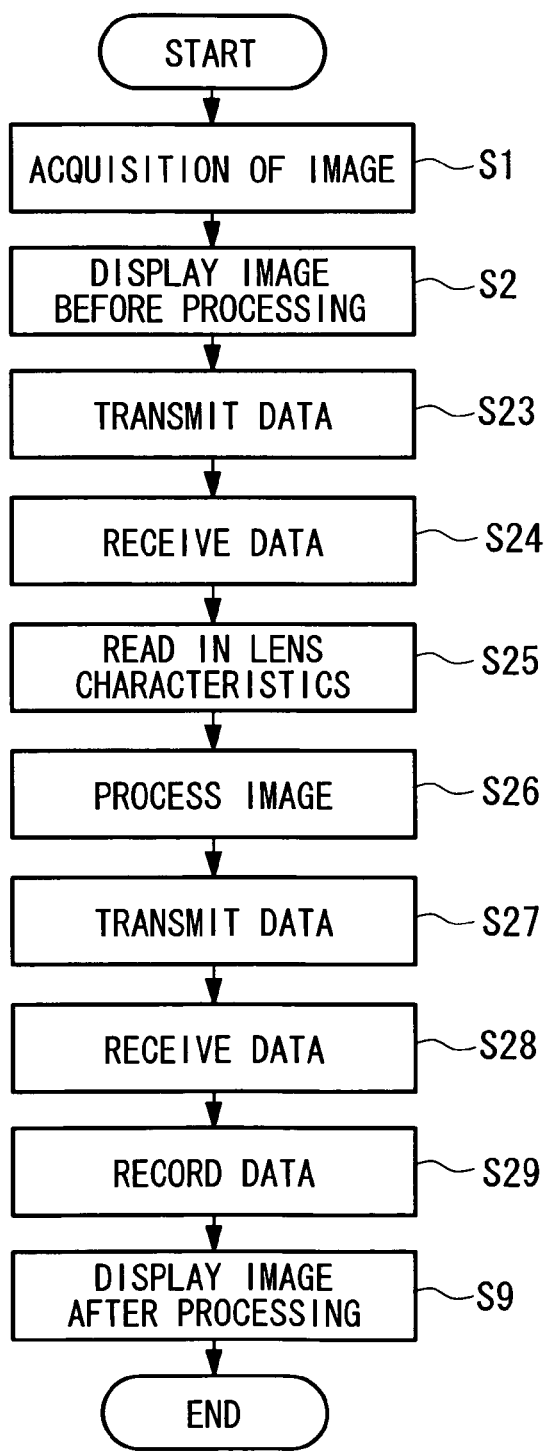
FIG. 6 is a flowchart explaining the operation of the camera of FIG. 5.

FIG. 6 is a flowchart explaining the operation of the camera of FIG. 5.

When a subject is picked up, the image of the subject, which is focused by the lens system 17 of the lens unit 5 is converted into image pickup data as an electric signal by the image pickup device 7 (step S1).

The image pickup data is input from the image pickup device 7 to the signal processing circuit 9 of the main body side controller 208. The signal processing circuit 9 subjects the image pickup data to signal processing and converts it into image data which can be processed in the display image signal processing unit 13 and the image processing unit 19. The image data is input from the signal processing circuit 9 to the display image signal processing unit 13 as the image data before the image processing. The display image signal processing unit 13 converts the image data before the image processing into image display data which can be displayed on the display unit 15. The image display data is input to the display unit 15 as well as stored to a cache memory. The display unit 15 displays the same image as the image of the subject subjected to the image processing and stored to the cache memory (step S2).

The image data before the image processing is also input to the first communication unit 211a. The first communication unit 211a transmits the image data before the image processing to the second communication unit 211b (step S23).

The second communication unit 211b receives the image data before the image processing from the first communication unit 211a (step S24). The image data before the image processing is input from the second communication unit 211b to the image processing unit 219. The image processing unit 219 reads out the lens characteristics from the lens characteristics memory unit 221 (step S25).

The image processing unit 219 subjects the image data before the image processing to image processing based on the algorithm in conformity with the lens characteristics and the characteristics of the lens system 17 and creates the image data after the image processing (step S26). The image data after the image processing, the image data before the image processing, and the lens characteristics, which are caused to correspond thereto, are output from image processing unit 219 to the second communication unit 211b.

The second communication unit 211b transmits the image data after the image processing, the image data before the image processing, and the lens characteristics, which are caused to correspond thereto, to the first communication unit 211a (step S27).

The first communication unit 211a receives the image data after the image processing, the image data before the image processing, and the lens characteristics, which are caused to correspond thereto, from the second communication unit 211b (step S28). The image data before the image processing and the lens characteristics, which are caused to correspond thereto, are input from the first communication unit 211a to the image memory unit 223 of the main body side controller 208 and stored to the image memory unit 223 (step S29).

The image data after the image processing is input from the image processing unit 219 to the display image signal processing unit 213 of the main body side controller 208. The display image signal processing unit 213 converts the image data after the image processing into the image display data which can be displayed on the display unit 15. The image display data is input to the display unit 15 as well as stored to the cache memory. The display unit 15 displays the same image as the image of the subject subjected to the image processing and stored to the cache memory (step S9).

Note that when the image of the subject subjected to the image processing is displayed based on the image data before the image processing and the lens characteristics, which are caused to correspond thereto, stored to the image memory unit 223, the image processing unit 219 reads the image data before the image processing and the lens characteristics which are caused to correspond thereto from the image memory unit 223 of the main body side controller 208 through the communication unit 211. The image processing unit 219 subjects the image data before the image processing to image processing based on the read lens characteristics and creates the image data after the image processing. The image data after the image processing is input to the display image signal processing unit 213 of the main body side controller 208 through the communication unit 211.

The display image signal processing unit 213 converts the image data after the image processing into the image display data which can be displayed on the display unit 15. The image display data is input to the display unit 15 as well as stored to the cache memory. The display unit 15 displays the same image as the image of the subject subjected to the image processing and stored to the cache memory.

According to the above arrangement, the image processing unit 219 is disposed to the lens unit 205, and the lens unit 205 and the image processing unit 219 are mounted on and dismounted from the camera main body 203 at the same time. Accordingly, even if the lens unit 205 is replaced with a lens unit having new lens characteristics and with a lens unit which must carry out image processing by a new image processing algorithm, image processing can be carried out using the new lens characteristics and the new image processing algorithm, thereby an excellent image can be obtained easily.

Modification of Second Embodiment

Next, a modification of the second embodiment will be explained referring to FIGS. 7 and 8.

Although the basic arrangement of a camera is the same as the second embodiment, a picked-up image processing method is different from the second embodiment. Thus, in the modification, only the arrangement and the processing method as to the modification of the picked-up image processing method will be explained using FIGS. 7 and 8, and the explanation of the other components and the like are omitted.

Figure 7:
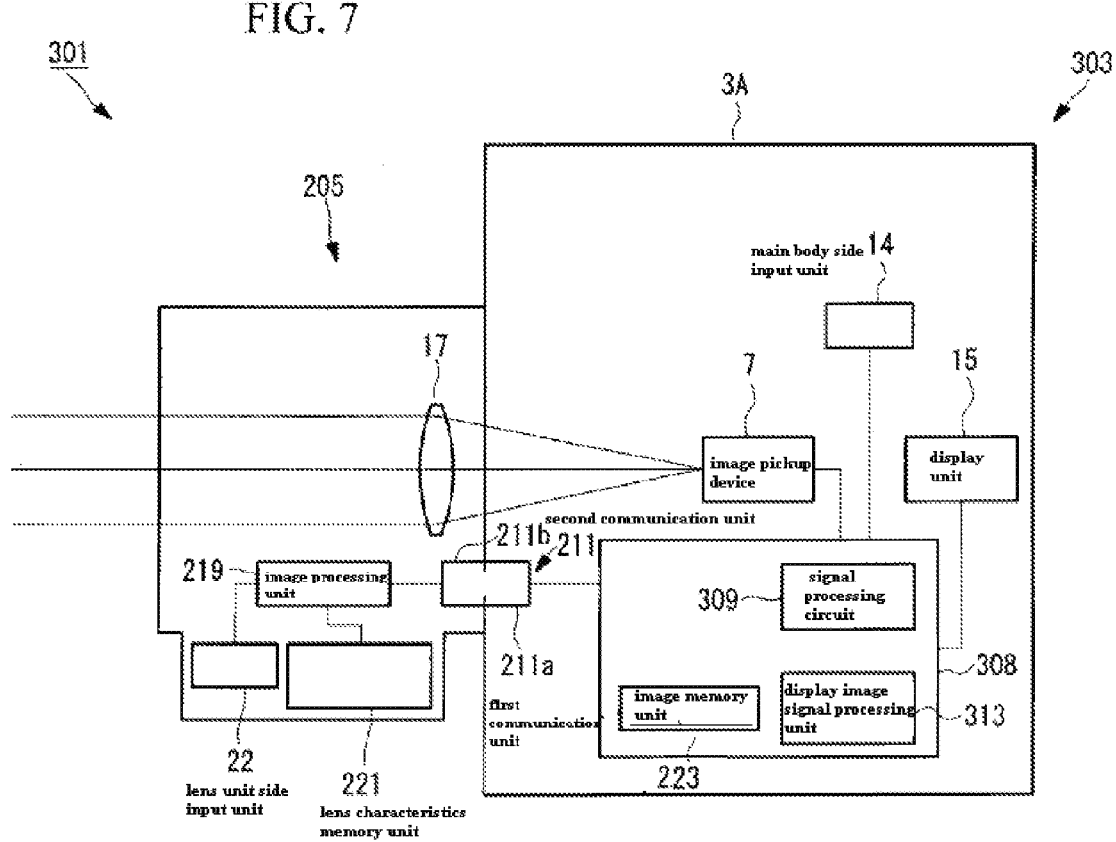
FIG. 7 is a block diagram explaining the overall arrangement of a camera according to a modification of the second embodiment.

FIG. 7 is a block diagram explaining the overall arrangement of the camera.

Note that the same components as those of the second embodiment are demoted by the same reference numerals and the explanation thereof is omitted.

The camera 301 is a digital electronic camera for picking up a subject image using an image pickup device such as a CCD and the likewise the second embodiment.

Figure 8:
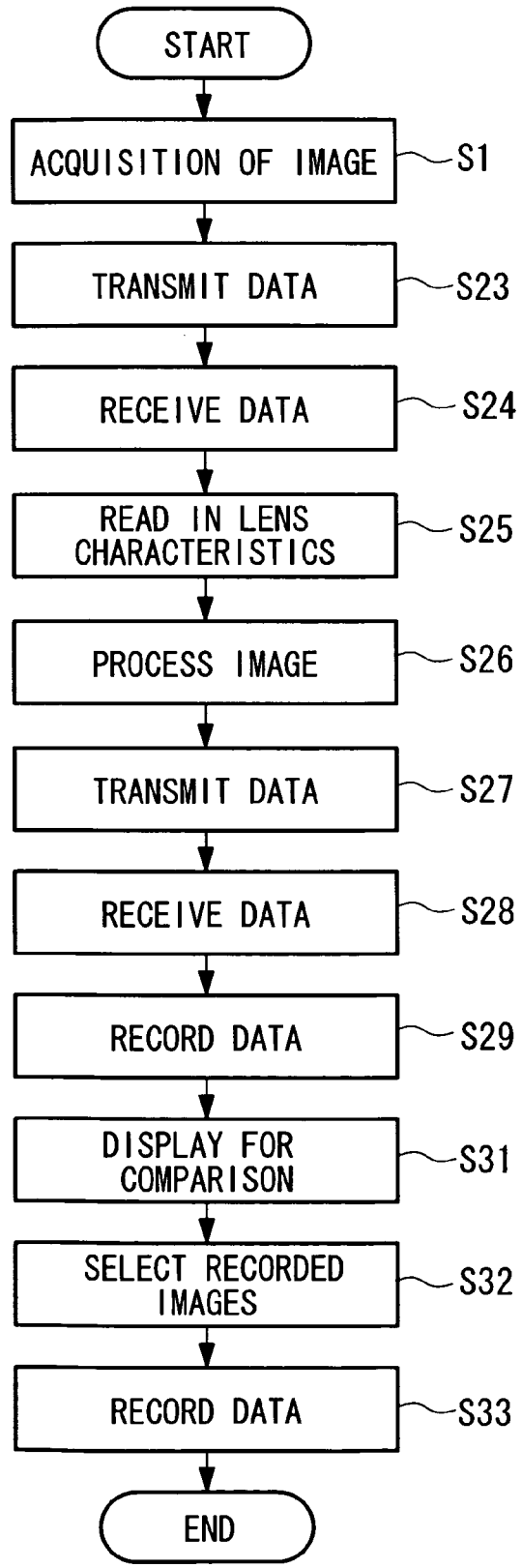
FIG. 8 is a flowchart explaining the operation of the camera of FIG. 7.

As shown in FIG. 8, the camera 301 has a camera main body 303 and a lens unit 205.

The lens unit 205 is detachably mounted on a housing 3A. Different types of lens units 205 can be mounted on the housing 3A.

The camera main body 303 has an image pickup device 7 and the like for picking up a subject image disposed therein, and the lens unit 205 is detachably mounted on the camera main body 303. As shown in FIG. 8, the camera main body 303 has the housing 3A, the image pickup device 7, a main body side controller 308, a first communication unit 211a, and a display unit 15.

The main body side controller 308 includes a signal processing circuit 309 and a display image signal processing unit 313. Further, a main body side input unit 14 is disposed to the main body side controller 308.

The signal processing circuit 309 creates image data by subjecting the image pickup data output from the image pickup device 7 to signal processing. The image pickup data is input from the image pickup device 7 to the signal processing circuit 309. The image data subjected to the signal processing in the signal processing circuit 309 is output to the first communication unit 211a.

The display image signal processing unit 313 creates image display data by subjecting the image data before and after the image processing to signal processing. The image data after the image processing is input to the display image signal processing unit 313 from the first communication unit 211a. The image display data is output from the display image signal processing unit 313 to the display unit 15.

Next, the operation and the picked-up image processing method in the camera 301 having the above arrangement will be explained.

FIG. 8 is a flowchart explaining the operation of the camera of FIG. 7.

When a subject is picked up, the image of the subject focused by the lens system 17 of the lens unit 5 is converted into image pickup data as an electric signal by the image pick-up device 7 (step S1).

The image pickup data is input from the image pickup device 7 to the signal processing circuit 309 of the main body side controller 308. The signal processing circuit 309 subjects the image pickup data to signal processing and converts it into image data which can be processed in the display image signal processing unit 113 and the image processing unit 119. The image data before the image processing is input to the first communication unit 211a. The first communication unit 211a transmits the image data before the image processing to the second communication unit 211b (step S23).

Thereafter, since the same processing as the second embodiment is carried out until the image data before the image processing and the lens characteristics which are caused to correspond thereto are stored to the image memory unit 223 (step S29), the explanation thereof is omitted.

The image data before the image processing and the image data after the image processing are input to the display image signal processing unit 313 from the image processing unit 219. The display image signal processing unit 313 converts the image data before and after the image processing into image display data which can be displayed by the display unit 15. The image display data before and after the image processing are displayed on the display unit 15 as well as stored to the cache memory. The display unit 15 displays the image data before and after the image processing for comparison (step S31).

The image data before and after the image processing may be simultaneously displayed by dividing the display surface of the display unit 15 or may be alternately displayed with a time lag without a particular limitation.

The photographer selects which of the image data before and after the image processing displayed on the display unit 15 is to be stored (step S32). The selected image data is stored to the image memory unit 223 (step S33). Specifically, when the image data before the image processing is selected, it is stored to the image memory unit 223 as it is. On the other hand, when the image data after the image processing is selected, it is stored to the image memory unit 23 after it is further caused to correspond to the lens characteristics.

According to the above arrangement, the photographer can determine whether or not he or she could apply intended image processing to the image data as well as can select whether or not the image data after the image processing is to be stored likewise the modification of the first embodiment.

Third Embodiment

Next, a third embodiment will be explained referring to FIGS. 9 and 10.

Although the basic arrangement of a camera is the same as the first embodiment, an image processing unit and an image memory unit are disposed differently from the first embodiment. Accordingly, in the embodiment, only the peripheries of the image processing unit and the image memory unit will be explained using FIGS. 9 and 10, and the explanation of the other components and the like is omitted.

Figure 9:
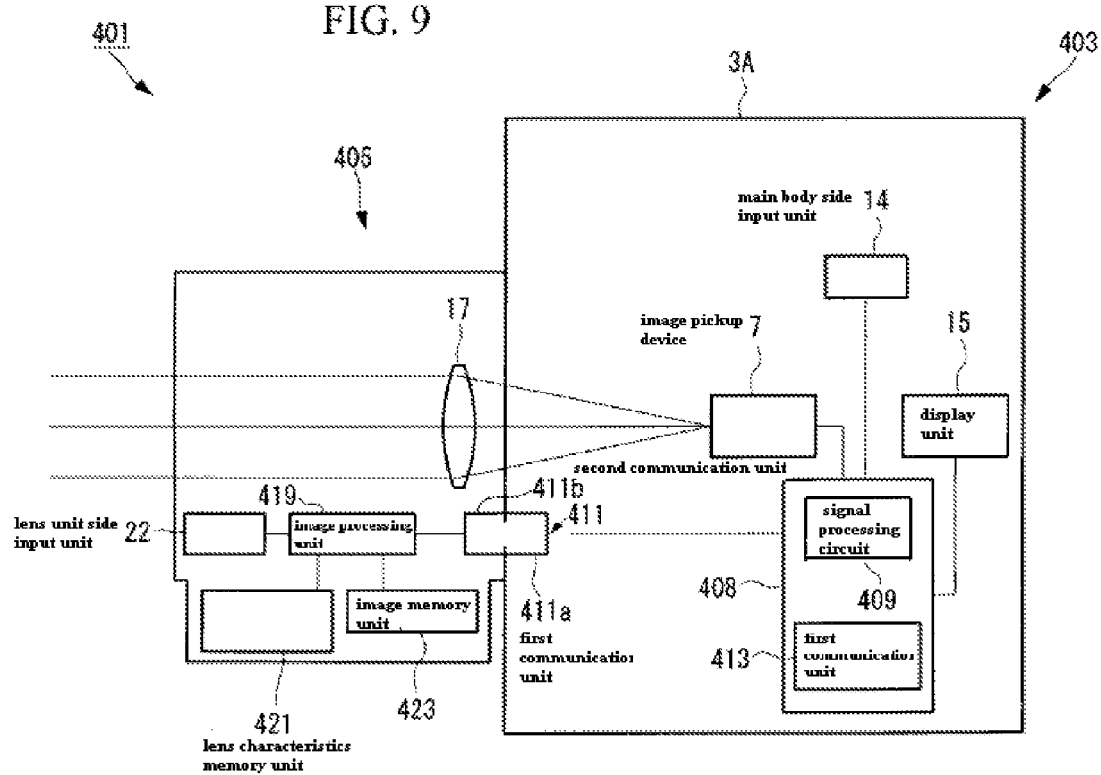
FIG. 9 is a block diagram explaining the overall arrangement of a camera according to a third embodiment.

FIG. 9 is a block diagram explaining the overall arrangement of the camera.

Note that the same components as those of the first embodiment are denoted by the same reference numerals and the explanation thereof is omitted.

The camera 401 is a digital electronic camera for picking up a subject image using an image pickup device such as a CCD and the like.

As shown in FIG. 9, the camera 401 has a camera main body 403 and a lens unit 405.

The lens unit 405 is detachably mounted on a housing 3A. Different types of lens units 405 can be mounted on the housing 3A.

The camera main body 403 has an image pickup device 7 and the like for picking up a subject image disposed therein, and the lens unit 405 is detachably mounted on the camera main body 403. As shown in FIG. 9, the camera main body 403 has the housing 3A, the image pickup device 7, a main body side controller 408, a first communication unit 211a, and a display unit 15.

The main body side controller 408 includes a signal processing circuit 409 and a display image signal processing unit 413. Further, a main body side input unit 14 is disposed to the main body side controller 408.

The signal processing circuit 409 creates image data by subjecting the image pickup data output from the image pickup device 7 to signal processing. The image pickup data is input to the signal processing circuit 409 from the image pickup device 7. The image data subjected to the signal processing in the signal processing circuit 409 is output to the first communication unit 411a and a display image signal processing unit 413.

The display image signal processing unit 413 creates image display data by subjecting image data before image processing and image data after image processing to signal processing. The image data before the image processing is input to the display image signal processing unit 413 from the signal processing circuit 409 as well as the image data after the image processing is input thereto from the first communication unit 411a. The image display data is output from the display image signal processing unit 413 to the display unit 15.

The first communication unit 411a constitutes a communication unit 411 together with a second communication unit 411b disposed to the lens unit 405 and exchanges the image data before and after the image processing. The image data before the image processing is input to the first communication unit 411a from the signal processing circuit 409 of the main body side controller 408 as well as the image data before the image processing and the image data after the image processing are input thereto from the second communication unit 411b. The image data before and after the image processing are output from the first communication unit 411a to the display image signal processing unit 413 of the main body side controller 408.

The display unit 15 displays the image of a subject based on the image display data. The image display data is input to the display unit 15 from the display image signal processing unit 13 of the main body side controller 408.

The lens unit 405 focuses a subject image to the image pickup device 7 by the lens system 17 disposed therein and is detachably mounted on the camera main body 403. As shown in FIG. 9, the lens unit 405 includes a lens system 17, the second communication unit 411b, an image processing unit (image processing means) 419, and a lens characteristics memory unit (optical characteristics memory unit) 421.

The second communication unit 411b constitutes the communication unit 411 together with the first communication unit 411a disposed to the camera main body 403, and reads lens characteristics. The image data before the image processing is input to the second communication unit 411b from the first communication unit 211a as well as the image data before the image processing and the image data after the image processing are input thereto from the image processing unit 419. The image data before the image processing is output from second communication unit 411b to the image processing unit 419 as well as the image data before the image processing and the image data after the image processing are output to the first communication unit 411a.

The image processing unit 419 applies image processing to the image data based on the lens characteristics of the lens system 17. The image data before the image processing is input to the image processing unit 419 from the second communication unit 411b as well as the lens characteristics are input thereto from the lens characteristics memory unit 421. Further, the image data before the image processing and the lens characteristics which are caused to correspond thereto are input to the image processing unit 419 from the image memory unit 423. The image data after the image processing is output from the image processing unit 419 to the second communication unit 411b as well as the image data before the image processing and the lens characteristics which are caused to correspond thereto are output to the image memory unit 23. Further, the image processing unit 419 has an algorithm for carrying out image processing in conformity with the characteristics of the lens system 17 of the lens unit 405.

The characteristics of the lens system 17 are stored to the lens characteristics memory unit 421. The lens characteristics are output from the lens characteristics memory unit 421 to the image processing unit 419. Note that optical characteristics such as the distortion and the like of the lens system 17 can be exemplified as the lens characteristics.

An image memory unit 423 stores the image data before the image processing and the lens characteristics by causing them to correspond to each other. The image data before the image processing and the lens characteristics which are caused to correspond thereto are input and output between the image memory unit 423 and the image processing unit 419.

Next, the operation and the picked-up image processing method in the camera 401 having the above arrangement will be explained.

Figure 10:
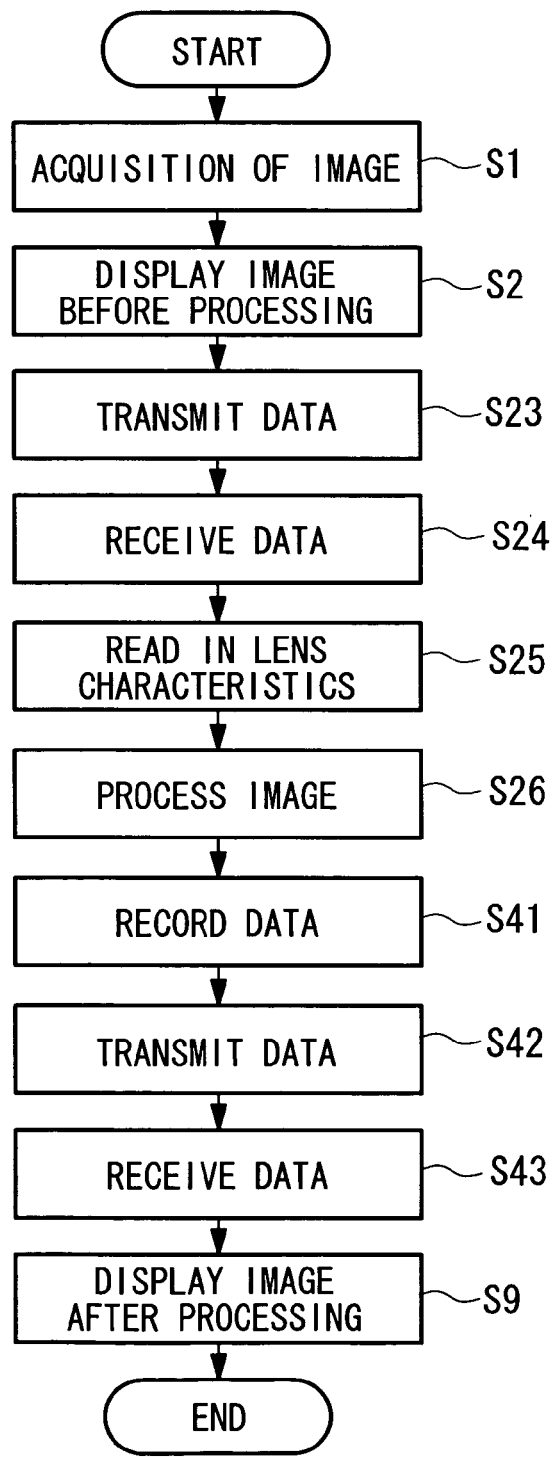
FIG. 10 is a flowchart explaining the operation of the camera of FIG. 9.

FIG. 10 is a flowchart explaining the operation of the camera of FIG. 9.

Since the operation of the camera 401 in the embodiment is the same as that of the second embodiment from the acquisition of an image (step S1) to image processing (step S26), the explanation of it is omitted.

The image data after the image processing is output from the image processing unit 419 to the second communication unit 411b as well as the image data before the image processing and the lens characteristics which are caused to correspond thereto are output to the image memory unit 423. The image memory unit 423 stores the image data before the image processing and the lens characteristics which are caused to correspond thereto (step S41).

The second communication unit 411b transmits the image data after the image processing to the first communication unit 411a (step S42).

The first communication unit 411a receives the image data after the image processing from second communication unit 411b (step S43).

The image data after the image processing is input from the second communication unit 411b to the display image signal processing unit 413 of the main body side controller 408. The display image signal processing unit 413 converts the image data after the image processing into the image display data which can be displayed on the display unit 15. The image display data is input to the display unit 15 as well as stored to a cache memory. The display unit 15 displays the same image as the image of the subject subjected to the image processing and stored to the cache memory (step S9).

According to the above arrangement, the image processing unit 419 is disposed to the lens unit 405 and the lens unit 405 and the image processing unit 419 are mounted on and dismounted from the camera main body 403 at the same time. Accordingly, even if the lens unit 205 is replaced with a lens unit having new lens characteristics and with a lens unit which must carry out image processing by a new image processing algorithm, image processing can be carried out using the new lens characteristics and the new image processing algorithm, thereby an excellent image can be obtained easily.

Modification of Third Embodiment

Next, a modification of the third embodiment will be explained referring to FIGS. 11 and 12.

Although the basic arrangement of a camera is the same as that of the third embodiment, a picked-up image processing method is different from the third embodiment. Thus, in the modification, only the peripheries of the arrangement and the processing method as to the modification of the picked-up image processing method will be explained using FIGS. 11 and 12, and the explanation of the other components and the like are omitted.

Figure 11:
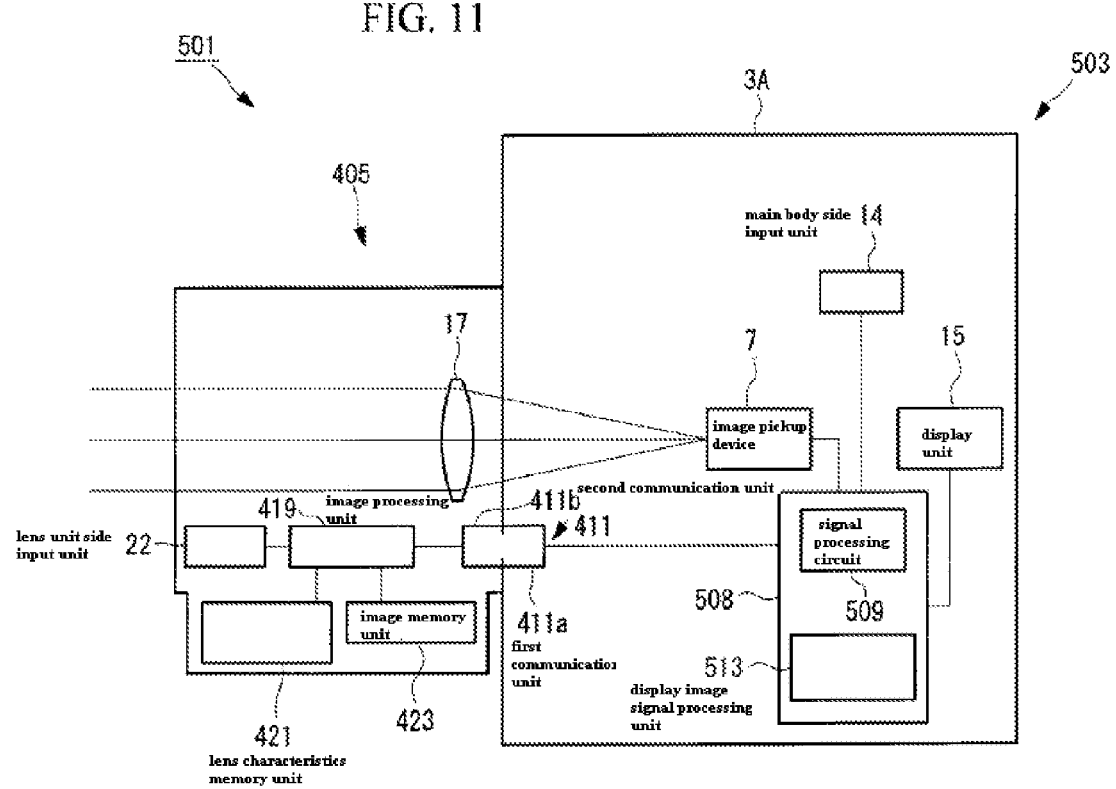
FIG. 11 is a block diagram explaining the overall arrangement of a camera according to a modification of the third embodiment.

FIG. 11 is a block diagram explaining the overall arrangement of the camera.

Note that the same components as those of the third embodiment are demoted by the same reference numerals and the explanation thereof is omitted.

The camera 501 is a digital electronic camera for picking up a subject image using an image pickup device such as a CCD and the likewise the third embodiment.

As shown in FIG. 11, the camera 501 has a camera main body 503 and a lens unit 405.

The camera main body 503 has an image pickup device 7 and the like for picking up a subject image disposed therein, and the lens unit 405 is detachably mounted on the camera main body 503. As shown in FIG. 11, the camera main body 503 has a housing 3A, an image pickup device 7, a main body side controller 508, a first communication unit 211a, and a display unit 15.

The main body side controller 508 includes a signal processing circuit 509 and a display image signal processing unit 513. Further, a main body side input unit 14 is disposed to the main body side controller 508.

The signal processing circuit 509 creates image data by subjecting the image pickup data output from the image pickup device 7 to signal processing. The image pickup data is input to the signal processing circuit 509 from the image pickup device 7. The image data subjected to the signal processing in the signal processing circuit 509 is output to the first communication unit 411a.

The display image signal processing unit 513 creates image display data by subjecting the image data before the image processing and the image data after the image processing to signal processing. The image data before the image processing and the image data after the image processing are input to display image signal processing unit 513 from the first communication unit 411a. The image display data is output from display image signal processing unit 513 to the display unit 15.

Next, the operation and the picked-up image processing method in the camera 501 having the above arrangement will be explained.

Figure 12:
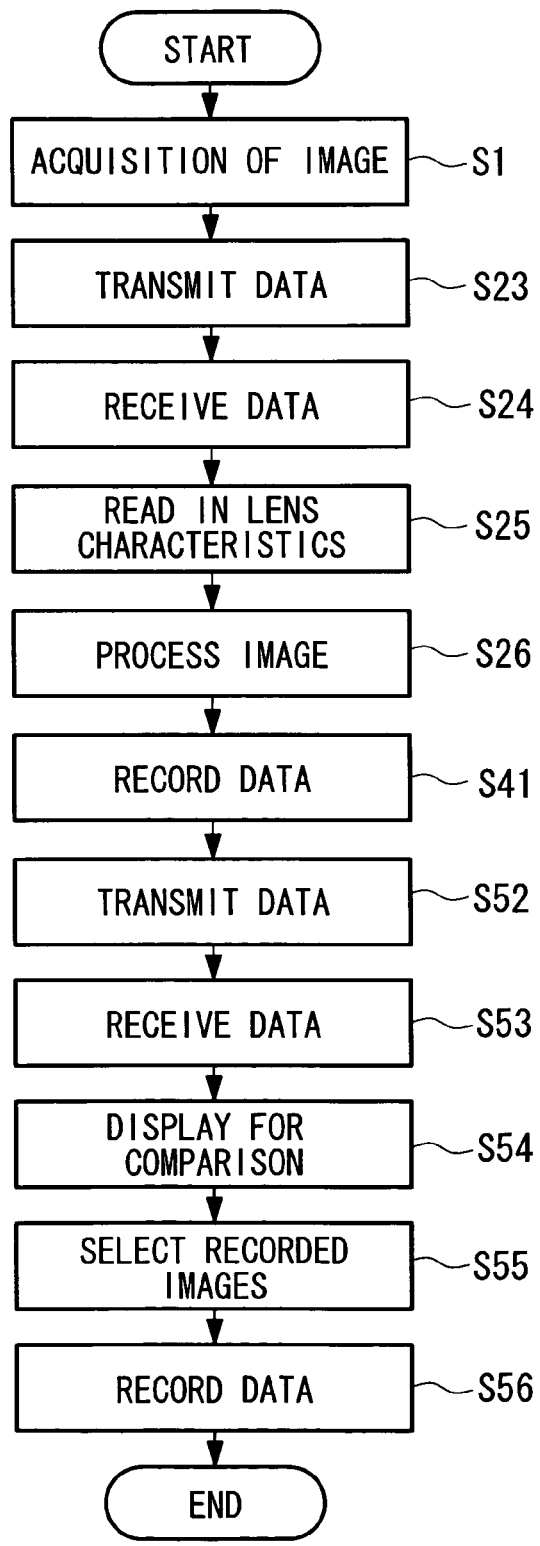
FIG. 12 is a flowchart explaining the operation of the camera of FIG. 11.

FIG. 12 is a flowchart explaining the operation of the camera of FIG. 11.

Since the operation of the camera 401 in the embodiment is the same as that of the third embodiment from the acquisition of an image (step S1) to image processing (step S26), the explanation of it is omitted.

The image data before the image processing and the image data after the image processing are input from the image processing unit 419 to the second communication unit 411b. The second communication unit 411b transmits the image data before the image processing and the image data after the image processing to the first communication unit 411a (step S52).

The first communication unit 411*a* receives the image data before the image processing and the image data after the image processing from the second communication unit 411*b* (step S53).

The image data before the image processing and the image data after the image processing are input to display image signal processing unit 513 from the first communication unit 411*a*. The display image signal processing unit 513 converts the image data before and after the image processing into the image display data which can be displayed by the display unit 15. The image data before and after the image processing are input to the display unit 15 as well as stored to a cache memory. The display unit 15 displays the image data before and after the image processing for comparison (step S54).

The photographer selects which of the image data before and after the image processing displayed on the display unit 15 is to be stored (step S55).

The selected image data is stored to the image memory unit 423 (step S56). Specifically, when the image data before the image processing is selected, the selected information is input to the image processing unit 419 through the communication unit 411, and the image data before the image processing is stored to the image memory unit 423 as it is based on the instruction of the image processing unit 419. On the other hand, when the image data after the image processing is selected, it is stored to the image memory unit 423 after it is further caused to correspond to lens characteristics.

According to the above arrangement, the photographer can determine whether or not he or she could apply intended image processing to the image data as well as can select whether or not the image data after the image processing is to be stored by comparing the image data before and after the image processing stored to the display unit 15.

What is claimed is:

1. A camera comprising:
   a camera main body;
   a lens unit having an image pickup optical system for focusing a subject image;
   an image pickup unit configured to pick up the subject image and to convert it into an image pickup signal, the image pickup unit being mounted on the camera main body;
   a signal processing unit configured to create first image data using the image pickup signal;
   an optical characteristics memory unit configured to store optical characteristics inherent to the image pickup optical system, the optical characteristics memory unit being mounted on the lens unit;
   an image memory unit configured to store the first image data and the optical characteristics of the lens unit that is used when the image pickup signal is obtained, the first image data and the optical characteristics stored being associated with each other;
   an image processing unit configured to create second image data by subjecting the first image data to image processing based on the optical characteristics which are associated with the first image data;
   a display unit mounted on the camera main body;
   a display image signal processing unit configured to create second display data by subjecting the second image data to image processing, and to cause the display unit to display the second image data; and
   a main body controller configured to output the first image data and the optical characteristics that are associated with the first image data simultaneously, from the camera main body to an external device.

2. A camera according to claim 1, wherein
   the display image signal processing unit is configured to create first display data by subjecting the first image data to image processing, and to cause the display unit to display the first image data for comparison with the second image data.

3. A camera according to claim 1, wherein the image memory unit stores the first image data and identification information of the lens unit,
   wherein the image memory unit is configured to associate the first image data with the identification information of the lens unit.

4. A camera according to claim 1, wherein:
   an optical characteristics read unit configured to read the optical characteristics from the optical characteristics memory unit is disposed to the camera main body.

* * * * *